(No Model.) 5 Sheets—Sheet 1.
W. H. CLARK.
COMBINED CASH REGISTER AND INDICATOR AND ADDING MACHINE.
No. 435,399. Patented Sept. 2, 1890.
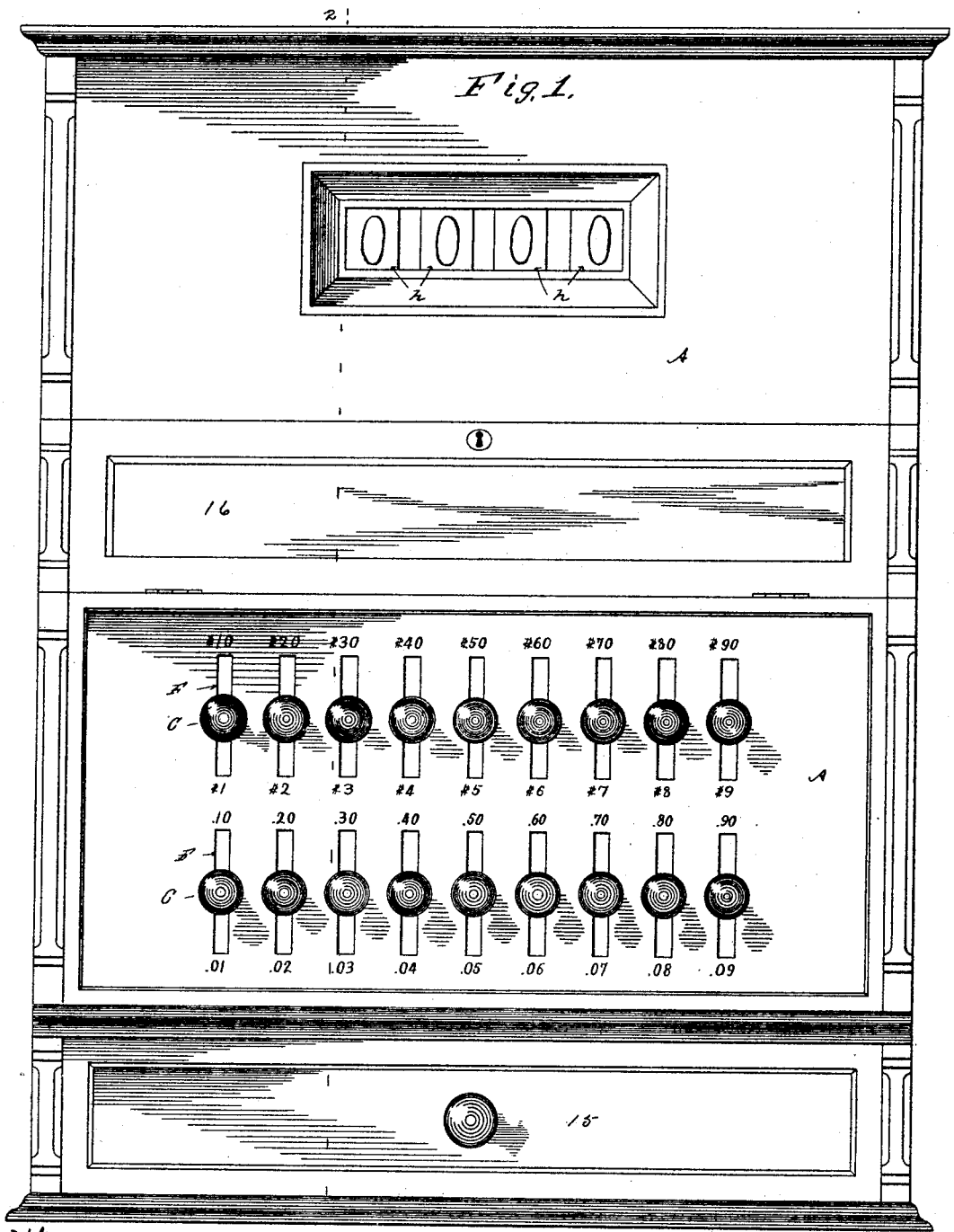
Witnesses.
H. M. Sturgeon.
C. Krauch.
Inventor.
William H. Clark
Per H. Sturgeon
Att'y.

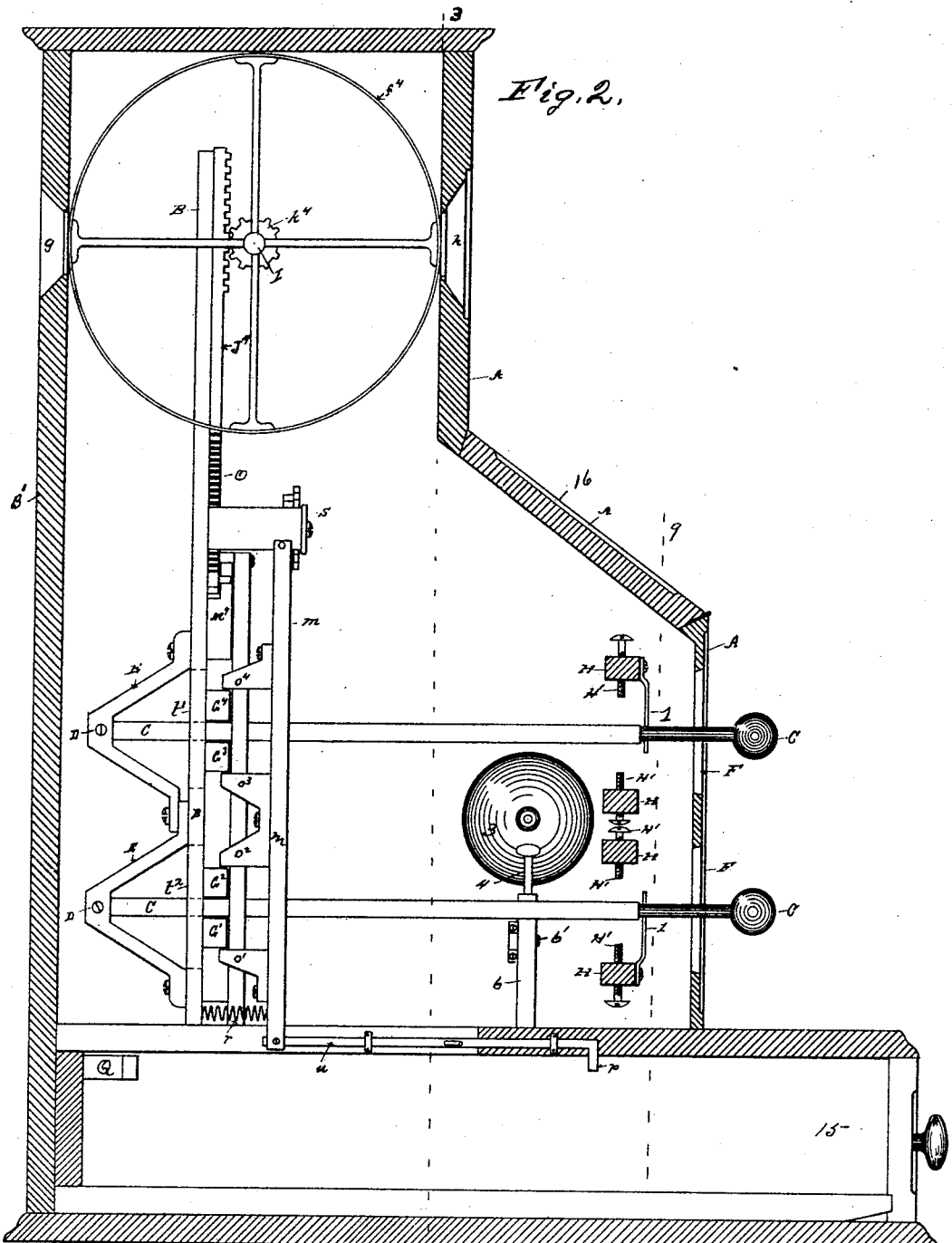

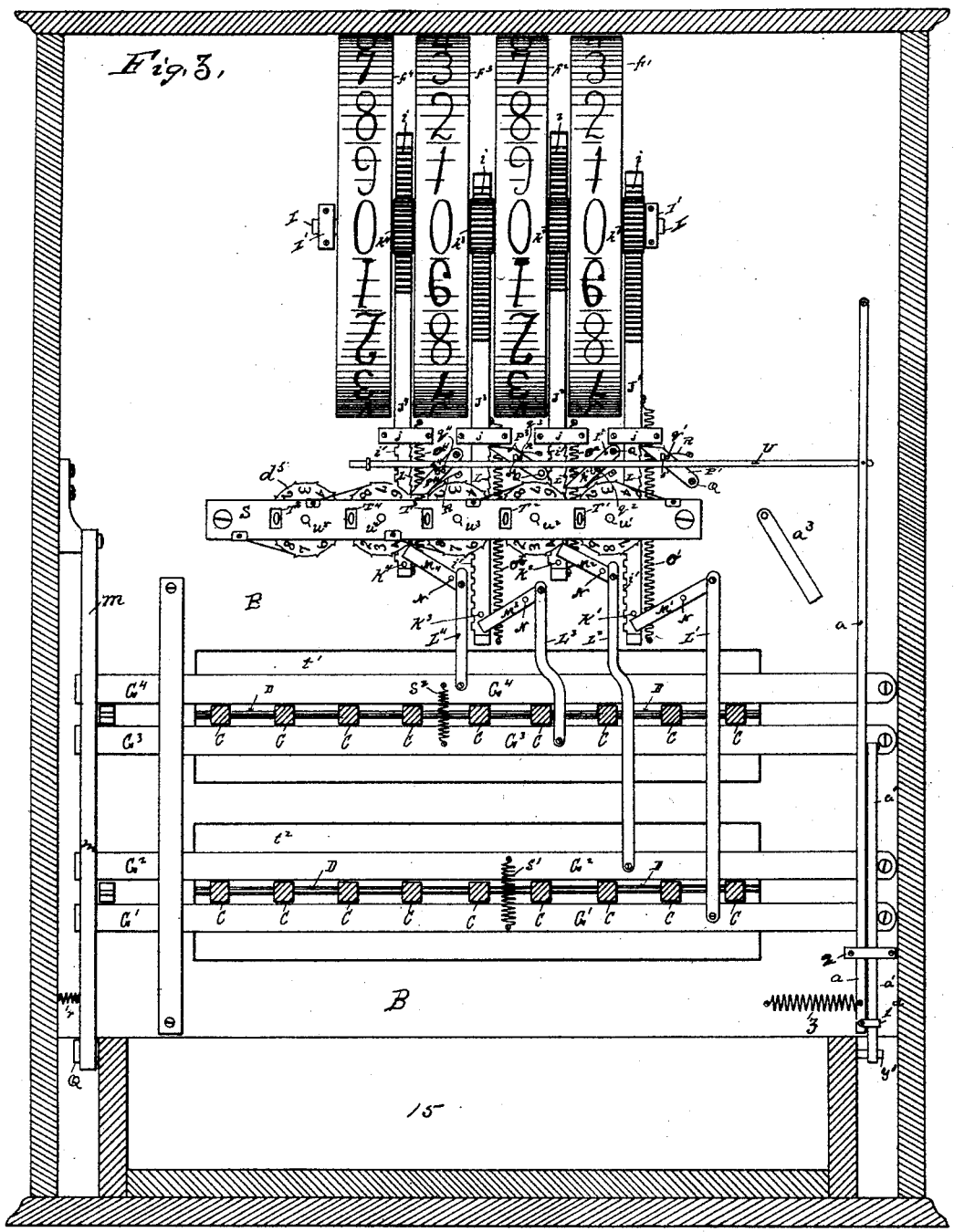

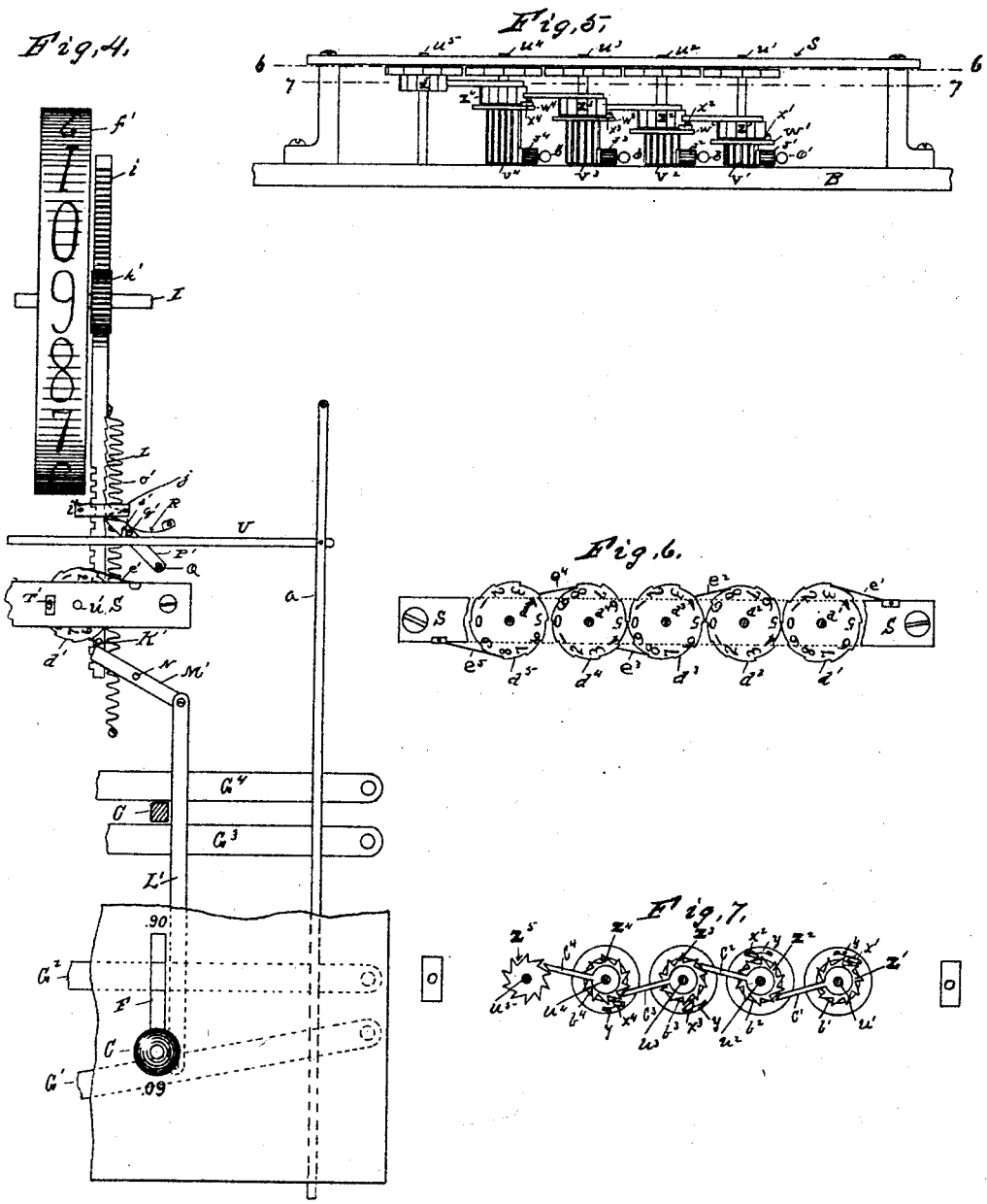

(No Model.) 5 Sheets—Sheet 5.
W. H. CLARK.
COMBINED CASH REGISTER AND INDICATOR AND ADDING MACHINE.
No. 435,399. Patented Sept. 2, 1890.
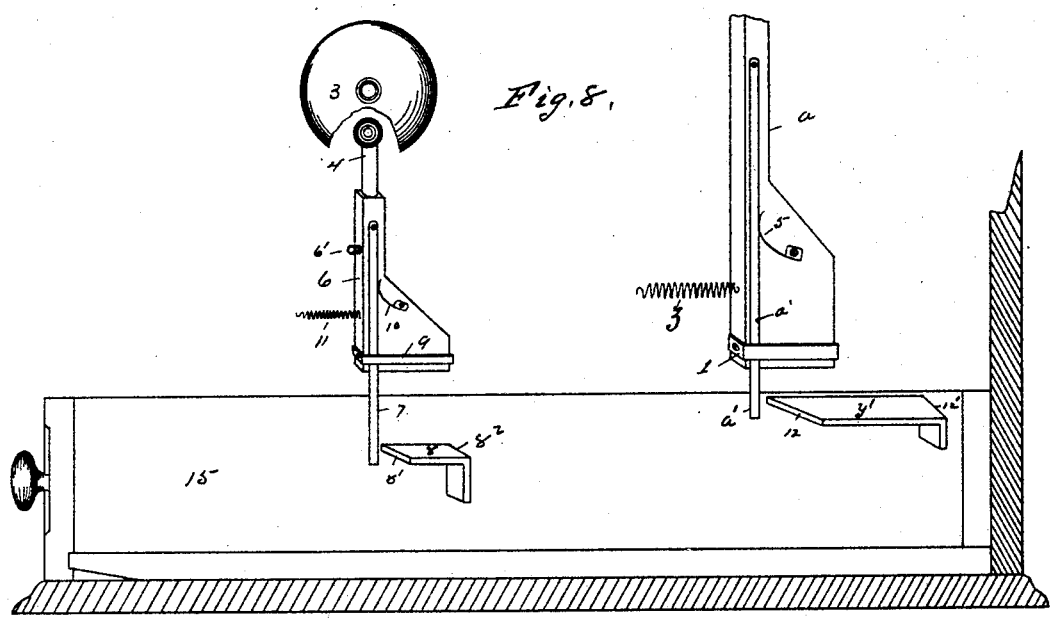
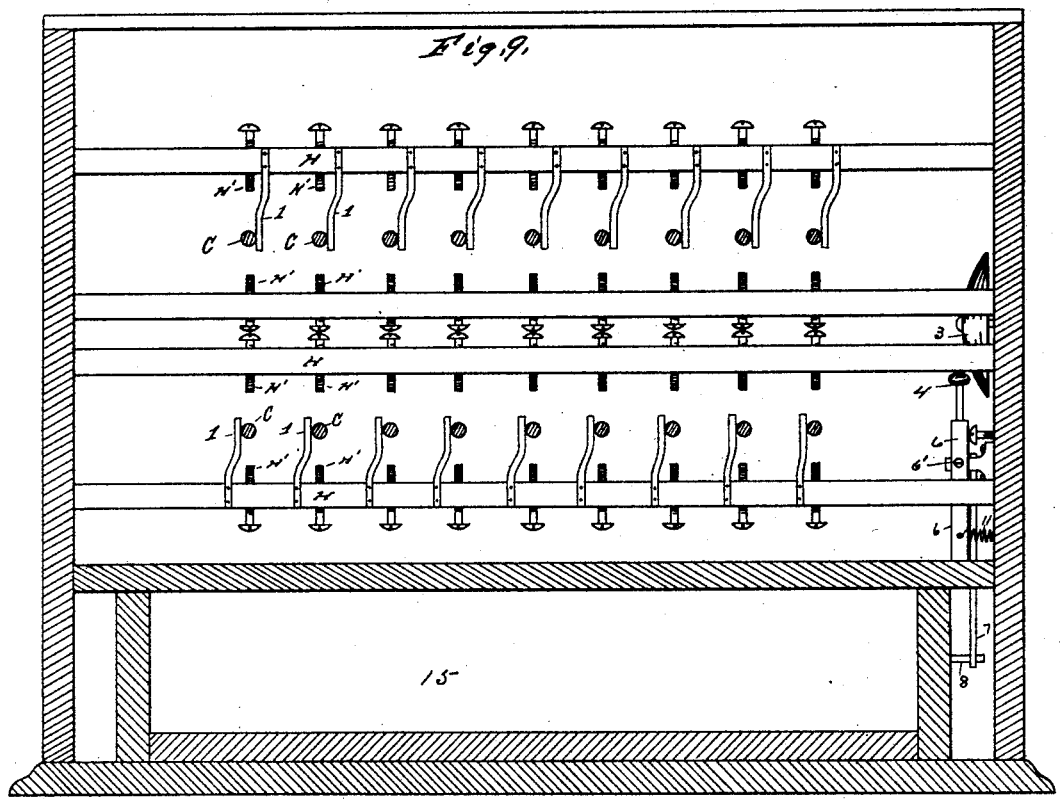

UNITED STATES PATENT OFFICE.

WILLIAM H. CLARK, OF ALBION, ASSIGNOR OF ONE-FOURTH TO THE LOVELL MANUFACTURING COMPANY, LIMITED, OF ERIE, PENNSYLVANIA.

COMBINED CASH REGISTER AND INDICATOR AND ADDING-MACHINE.

SPECIFICATION forming part of Letters Patent No. 435,399, dated September 2, 1890.

Application filed April 27, 1888. Renewed June 10, 1889. Again renewed February 10, 1890. Serial No. 339,890. (No model.)

*To all whom it may concern:*

Be it known that I, WILLIAM H. CLARK, a citizen of the United States, residing at Albion, in the county of Erie and State of Pennsylvania, have invented certain new and useful Improvements in a Combined Cash Register and Indicator and Adding-Machines; and I do hereby declare the following to be a full, clear, and exact description of the invention, such as will enable others skilled in the art to which it appertains to make and use the same, reference being had to the accompanying drawings, and to the letters and figures of reference marked thereon, forming part of this specification.

My invention consists in the improvements in a combined cash register and indicator and adding machine hereinafter set forth and explained, and illustrated in the accompanying drawings, in which—

Figure 1 is a front elevation of my improved combined cash register and indicator and adding-machine. Fig. 2 is a vertical cross-section of same on the line 2 2 in Fig. 1, looking in the direction of the arrow. Fig. 3 is a vertical longitudinal section of same on the line 3 3 in Fig. 2, looking in the direction of the arrow. Fig. 4 is a detail view of a section of the mechanism shown as a whole in Fig. 3, illustrating the operation thereof. Fig. 5 is a detail view, looking upward, of a portion of the registering mechanism of my machine. Fig. 6 is a longitudinal vertical section of same on the line 6 6 in Fig. 5, the outside plate being removed therefrom. Fig. 7 is a longitudinal vertical section of same on the line 7 7 in Fig. 5. Fig. 8 is a detail view of the bell and indicator-unlocking operating mechanism of my machine. Fig. 9 is a longitudinal vertical section of my machine on the line 9 9 in Fig. 2, looking in the direction of the arrow.

Like letters refer to like parts in all the figures.

The principal objects of my invention are, first, to construct a combined cash register, indicator, and adding-machine that is adapted to operatively perform all of the functions named; second, to construct such machine with mechanism adapted to accurately indicate, register, and add up all amounts to any extent from cipher to thousands; third, to combine suitable levers with indicating and registering wheels and intermediate mechanism connecting the same together in such a manner as to produce the results hereinafter specified and described.

The other features of my invention will be set forth and described hereinafter in the specification and claims.

In the construction of my invention shown, A is a suitable frame or case having a vertical back plate B, secured therein substantially in the position indicated in Fig. 2. To this plate B the main part of the operative mechanism hereinafter described is secured. To this plate B, I secure brackets E, to which are pivoted a series of levers or keys C, the outer ends of which project through slots F in the lower part of the front of the case A and are provided with knobs for operating them.

In the drawings I show eighteen of these keys C, the slots F, wherein the outer ends of these keys operate, being numbered at their upper and lower ends, the lower row of figures representing units, the next tens, the next hundreds, and the next thousands, the normal position of the key-levers C in the slots when at rest being at the center vertically of the slots F, so that they are adapted to be moved from the center of the slot upward, or from the same point downward, according to the amount to be indicated, registered, or added, each of the keys C returning thereafter to its normal position at the center of the slots F.

On the back plate B, preferably at one side thereof, I pivot a series of main levers $G'$ $G^2$ $G^3$ $G^4$, as shown in Fig. 3, these levers $G'$ and $G^2$ being, respectively, above and below the lower row of key-levers C and in close proximity thereto, and the levers $G^3$ and $G^4$ in like relation and proximity to the upper row of key-levers C.

Near the front of the case A, I secure therein a series of cross-bars H, in which I place adjusting-screws $H'$, as illustrated in Figs. 2 and 9, by means whereof the vertical movement of the keys C is adjusted. I also secure to the bars H springs I, which operate against the sides of the key-levers C to retain the balance of them in their normally central position by friction when any one of the keys C is being operated. The levers C operate to move the main levers G', &c., as the key-levers come in contact therewith by being raised or lowered in the slots F, as and for the purpose hereinafter set forth. From these main levers G', &c., vertical connecting-rods L' L² L³ L⁴ extend upward to and connect with short levers M' M² M³ M⁴, pivoted, respectively, to the back plate B at N N N N, the opposite ends of the levers M engaging with stud-pins K', K², K³, and K⁴ in the lower ends of vertical rack-bars J' J² J³ J⁴, the connections being so made that movement of the keys C operating the main levers G', &c., is communicated to and operates to raise or lower the rack-bars J, as required, these connections and their operation being illustrated in Fig. 3. These rack-bars J are secured in guides $j$ on the back plate B, so that they will slide up and down freely, and have racks $i$ on the front faces thereof at their upper ends, which intermesh with pinions $k'\ k^2\ k^3\ k^4$, secured to indicator-wheels $f'\ f^2\ f^3\ f^4$, as and for the purpose hereinafter specified. On their lower ends the bars J', &c., are provided with racks $i'$ on one edge, which intermesh with pinions V' V² V³ V⁴, as and for the purpose hereinafter set forth, and on the other and opposite edges the bars J', &c., have ratchet-teeth L, which are adapted to engage with pawls P' P² P³ P⁴, pivoted to the back plate B, as and for the purpose hereinafter set forth.

On one side of each of the rack-bars J, I secure retracting-springs O' O² O³ O⁴, one of the ends of these springs being secured to the back plate B, which springs operate to move the rack-bars J', &c., back to place after they have been moved by the action of the key-and-lever mechanism hereinbefore described.

In operation the movement of the key-levers C operates through the main levers G' &c., the connecting-rods L', &c., the levers M', &c., and rack-bars J', &c., to operate the indicator-wheels $f'$, &c., these wheels $f'$, &c., being mounted loosely on a horizontal shaft I, secured in brackets I' to the back plate B. These indicator-wheels $f'\ f^2\ f^3\ f^4$ are also supplied on their peripheries with figures from 0 to 9, two sets of said figures being placed upon each wheel, one set occupying one half of the periphery and the other set the other half, so that when operated one set of figures can be seen through the openings $g$ in the back of the case A, and the other set through the openings $h$ in the front side of the case, so that the amount is indicated by reading the figure on each wheel shown at the openings $g$ or $h$.

The registering mechanism of my device consists of the following parts shown particularly in Figs. 3, 5, 6, 7, and 8. To the back plate B is secured a plate S, with five openings T' T² T³ T⁴ T⁵, constituting the reading-line. In this plate are journaled the ends of five shafts $u'$ $u^2\ u^3\ u^4\ u^5$, the opposite ends of said shafts being journaled in the back plate B, so as to revolve readily. On the shafts $u'$, &c., next to the bed-plate B, are four spur-wheels V' V² V³ V⁴, engaging with the racks $i'$ on the rack-bars. Next to and outside of the spur-wheels V', &c., are circular plates W' W² W³ W⁴, and on the ouside of these circular plates W and pivoted thereon are pawls X' X² X³ X⁴, each held in position by springs $y$, (see Fig. 7,) the spur-wheels V', &c., circular plates W', &c., and pawls X', &c., thereon revolving loosely around the shafts $u'$, &c. The pawls X', &c., engage with toothed wheels Z' Z² Z³ Z⁴ Z⁵ on said shafts $u'$, &c., which have ten teeth each and are secured fast to their respective shafts $u'$, &c. Each tooth in the wheels Z', &c., represents a number on the ratchet-wheels $d'$, &c., hereinafter described. On one side of these toothed wheels Z', &c., are guard-plates $b'\ b^2\ b^3\ b^4$, so the pawls X', &c., will each engage with the teeth in the wheels Z', &c. (Illustrated in Fig. 7.)

Mounted on the shafts $u'$, &c., above the toothed wheels Z', &c., are pawls or carrying-points C' C² C³ C⁴, so that at every revolution of the shafts $u'$, &c., the pawls or carrying-points C', &c., engage with one of the teeth in the adjacent toothed wheel, moving it forward one tooth or notch. On the other side of or in front of the pawls or carrying-points C' C² C³ C⁴ are ratchet-wheels or plates $d'\ d^2\ d^3\ d^4\ d^5$, secured upon the shafts $u'$, &c. These ratchet-wheels have ten teeth, each tooth having a number on the outer face of the plate corresponding thereto. These ratchet-wheels are held from moving backward by spring-dogs $e'\ e^2\ e^3\ e^4\ e^5$, secured to the plate S, the springs $e'$, &c., acting as brakes on the ratchet-wheels $d'$, &c., as well as dogs, preventing any change in their positions not caused by the key-and-lever mechanism. It will be seen that every revolution of the first wheel $d'$ and unit-pawl or carrying-point C' moves the ratchet-wheel $d^2$ or the tens-wheel one notch, and they are prevented from moving back by the spring-dogs $e'$ and $e^2$, and every revolution of the tens-lever or carrying-point C² and ratchet-wheel $d^2$ moves the hundreds ratchet-wheel $d^3$ one notch, &c., every revolution of one of the pawls or carrying-points C', &c., moves the ratchet-wheel to its left one notch, and the aggregate amount of the figures shown at the openings T in the plate S is the amount to be read as the result.

As hereinbefore stated, the indicator-wheels $f'\ f^2\ f^3\ f^4$ have two sets of figures thereon— one set showing at openings $g$ in the back of the case A and one set showing at opening $h$ in the front of the case, so that the result can be read with equal facility from either side of the case. To accomplish this end I make the spur-wheels $k'$, &c., of twice the diameter of the spur-wheels V', &c. Consequently one revolution of the spur-wheel V' only moves the spur-wheel $k'$ and the indicator-wheel $f'$ secured thereto half around. To the back plate B is secured a guard $l^3$, to hold the main levers in position.

Pivoted loosely at the left hand of the case is a swinging lever $m$, running down to a rod $u$. (See Fig. 2.) To this lever $m$ are secured four lugs $o'$ $o^2$ $o^3$ $o^4$, which hold the respective levers $G'$ $G^2$ $G^3$ $G^4$ from being moved until they are released. The rod $u$ has a point $p$ projecting down to the side of the drawer 15, and is secured so as to have a sliding motion, and is adapted to engage with a catch Q secured to the side of the drawer, so that when the drawer is pulled nearly open the catch Q catches the point $p$ of the rod $u$, sliding it in its guides so as to swing the lever $m$ and pull the points $o'$, &c., away from the ends of the main levers $G'$, &c.

$r$ is a coil-spring, one end of which is secured to the lever $m$ and one end to the back plate B. When the drawer is being closed, this spring $r$ brings the lever $m$ back to such position that the points $o'$, &c., hold the four main levers $G'$, &c., in position, so that the keys cannot be worked until the drawer is pulled out and the levers $G'$, &c., released.

$S'$ and $S^2$ are spiral springs, the ends of each spring being secured to one of the main levers, so as to bring the main levers back to their normal position, as illustrated in Fig. 1.

$t'$ $t^2$ are openings in the back plate B, through which the key-levers C pass to the rods D in the brackets E, upon which they are pivoted.

$u$ is a sliding rod pivoted at the right-hand end thereof to a swinging lever $a$, the upper end of which is pivoted to the back plate B.

In the sliding rod $u$ are stud-pins $s'$ $s^2$ $s^3$ $s^4$, which engage with stud-pins $q'$ $q^2$ $q^3$ $q^4$ on the pawls $P'$ $P^2$ $P^3$ $P^4$, so that the movement of the sliding rod $u$ to the right operates to disengage the pawls $P'$, &c., from the notches L in the rack-bars $J'$, &c.

To the swinging lever $a$ is pivoted a shorter lever $a'$, running down to a catch $y'$ on the side of the drawer 15, and held against said catch by means of a spiral spring $z$.

$l^3$ is a guard on the lower end of the lever $a$ for the end of the lever $a'$, letting the end of the lever $a'$ move back and forth on long lever $a$. The lever $a'$ is held to the front of lever $a$ by a spring 5. In Fig. 3 the lower end of the lever $a$ and the lever $a'$ are shown as passing through a guide 2, secured to the back plate B, so as to form a slot for them to operate in.

On the right-hand side of the case A in Fig. 2 is a bell 3, pivoted to the side of the case A. (Further illustrated in Fig. 8.)

4 is the bell-hammer secured to block 6. To this block 6 is pivoted loosely a lever 7, running down in front of catch 8, on the side of the drawer 15.

Secured to block 6 is a guard 9. This guard lets the end of the lever 7 swing back and forth, the lever 7 being held in its normal position by the spring 10, the block 6 being held against the side of the drawer 15 by spiral spring 11.

Fig. 8 shows a view of these parts in elevation when the drawer 15 is pulled out, the point of catch 8 moving between the side of the drawer and lever 7. The catch having a slanting face $8'$, it presses the lever 7 toward the side of the case. This moves the block 6 correspondingly, which motion brings the bell-hammer 4 farther away from the bell 3, and as the catch 8 passes the lever 7 it flies back to its normal position and the hammer 4 strikes the bell. Now, when the drawer 15 is closed, the square end $8^2$ of catch 8 comes in contact with lever 7, which moves the lever 7 the length of the catch 8, so that the catch 8 passes under the lever 7, the spring 10 bringing the lever 7 back to its normal position. As will be seen, the bell only rings when the drawer 15 is pulled out and not when the drawer is being closed.

The catch $y'$, which engages with the levers $a$ and $a'$, operates the same as the bell-lever catch hereinbefore described, operating the lever $a$ and sliding rod $u$ as the drawer 15 is pulled out, and releasing the pawls $P'$ $P^2$ $P^3$ P from the rack-bars $J'$, &c., and when the drawer 15 is being closed the swinging lever $a$ does not move.

In operation the machine is adjusted so that when the key-levers C are at rest at the centers of the vertical slots F the indicator-wheels $f'$, &c., showing 0 through the openings $g$ and $h$, and the registering-wheels $d'$ $d^2$ $d^3$ $d^4$ $d^5$ likewise show 0 through the openings $T'$, &c., in the plate S inside of the case A, this portion of the case being ordinarily kept closed and locked. Now if, for example, a cash sale amounting to twenty-four dollars and twenty-five cents is made, and the drawer is pulled out, (the keys cannot be worked when the drawer is closed,) the bell rings an alarm, and as the catch Q on the drawer 15 strikes the point $p$ on the rod $u$, this swings out the lever $m$, withdrawing the lugs $o'$ $o^2$ $o^3$ $o^4$ from the main levers $G'$ $G^2$ $G^3$ $G^4$, leaving them free to be operated by the keys C. The pulling of the drawer 15 open also releases the pawls $P'$ $P^2$ $P^3$ $P^4$ from the rack-bars $J'$, &c., leaving them free to be moved by the operation of the keys C. Now, one of the keys C in slot F is raised to the twenty-dollar mark until it comes in contact with the adjusting-screw $H'$. Another of the keys C is then pressed downward to the four-dollar mark until it comes in contact with its adjusting-screw $H'$. Another of the keys C is then raised up to the twenty-cent mark until it comes in contact with its adjusting-screw $H'$, and finally another key C is pressed downward to the five-cent mark until it comes in contact with its adjusting-screw $H'$. The figures at the openings $g$ and $h$ in the case will then read $24.25, and the register on the inside of the case will show a like amount. In this operation the pressing of the key to the twenty-dollar mark moved up the main lever $G^4$, raising the connecting-rod $L^4$, which moved the short lever $M^4$, and the point of the short lever $M^4$ engaging with the pin $K^4$ moved the rack-bar $J^4$ down, rotating the spur-wheel $V^4$, the pawl $X^4$ engaging the toothed wheel $z^4$. This wheel moved with it the pawl or carrying point $C^4$ and ratchet-wheel $d^4$ two notches, where they were held by the spring $e^4$, thus bringing figure 2 to the opening $T^4$ in the plate S, the pawl $P^4$ meanwhile having engaged with the notches L on the side of the rack-bar $J^4$, retaining it in that position. The same movement of the rack-bar $J^4$ moved the spur-wheel $k^4$, turning the indicator-wheel $f^4$ around until it brought the figure 2 to the openings $g$ and $h$ in the case A. In pressing the key C to the four-dollar mark I moved down the main lever $G^3$, the connecting-rod $L^3$ moving the short lever $M^3$, which engaged the pin $K^3$ and moved the rack $J^3$ up, the rack-bar $J^3$ moving the spur-wheel $V^3$, the pawl $X^3$ engaged with the wheel $Z^3$, moving this wheel and with it the pawl or carrying-point $C^3$ and ratchet-wheel $d^3$ four notches, where they were retained by the spring $e^3$, bringing figure 4 to the opening $T^3$ in plate S, the pawl P meanwhile engaging with notches L on the side of the rack-bar $J^3$, retaining it in that position. In this operation the rack-bar $J^3$ moved the spur-wheel $k^3$ and the indicator-wheel $f^3$ until it brought the figure 4 opposite the openings $g$ and $h$. The two movements of the keys and mechanism described typify each and every movement of the keys and the parts of the mechanism operated thereby. If we now close the drawer 15, the indicator-wheels and registering-disks remain as they are, the closing of the drawer locking the main levers $G'$ $G^2$ $G^3$ $G^4$, as described, and I have \$24.25 shown at the openings $h$ and $g$ in plain view both at the front and back of the case, and also I have \$24.25 registered at the openings $T'$ $T^2$ $T^3$ $T^4$ in the plate S, and by unlocking and raising the lid 16 in front of the case the amount can be read there also. Every time the drawer 15 is pulled out the indicator-wheels return the figures naught (0) to the openings $g$ and $h$; but the registering-wheels $d'$ $d^2$ $d^3$ $d^4$ $d^5$ remain in the position to which they have been moved and continue to advance as each amount is registered, thus adding up and registering the total amount received up to any time at which it is examined.

The object of locking the main levers $G'$ $G^2$ $G^3$ $G^4$ and keys when the drawer is closed is to avoid mistakes and have the indicator-wheels all return to naught (0) before making another sale, which is accomplished by pulling the drawer out, as described.

It will be seen that the ratchet-wheels represent, respectively, $d'$, units; $d^2$, tens; $d^3$, hundreds; $d^4$, thousands; $d^5$, tens of thousands, while the respective pawls or carrying-points $C'$, &c., do the carrying.

When at the close of business-hours it is desired, after ascertaining the whole amount of cash received by the register during the day, to reset the machine and start again with the register in such a position as to indicate that no cash has yet been taken in or is on hand, I open the lid 16, and commence at the unit-wheel $d'$ and turn all the ratchet-wheels $d'$ $d^2$ $d^3$ $d^4$ $d^5$, so that the figure naught (0) is shown at the openings $T'$ $T^2$ $T^3$ $T^4$ $T^5$.

To adjust the machine for adding long columns of figures, I turn the button $a^3$, pivoted to the back plate B at the side of the case. The end of the button $a^3$ then presses the swinging lever $a$ outward and the pawls $P'$ $P^2$ $P^3$ $P^4$ out of contact with the rack-bars $J'$, &c. Then with the pawls disengaged from the rack-bars $J'$, &c., spur-wheels $k'$, &c., and the indicator-wheels $f'$, &c., secured thereto, the spur-wheels $V'$, &c., and pawls $X'$, &c., work with main levers $G'$, &c., and the indicator parts of the mechanism return to the zero-point every time a number is added. The drawer must be open at this time, as this keeps the lugs $o'$ $o^2$ $o^3$ $o^4$ from locking the main levers $G'$, &c. Before commencing to add, the registering-wheels must be adjusted by turning them all to zero (0) at the openings $T'$, &c., in the plate S. We can then add one, two, three, or four columns at once, if desired, in the same manner and by the same movements of the keys as hereinbefore described, and the total amounts will register and can be read at the openings T in the plate S.

When I desire to indicate and register, I turn the button $a^3$ away from the lever $a$, as shown in Fig. 3, and reset the ratchet-wheels $d'$, &c., to the zero-mark (0,) as hereinbefore described, when it is ready for use as a register and indicator. The button $a^3$ can only be turned against the lever $a$, as described, by unlocking the lid 16 at the front of the case. Every key operates two numbers, and by means of an up and down motion of each of the eighteen keys, one at a time, the machine described will indicate and register the amounts of any single sale below ninety-nine dollars and ninety-nine cents, and register the aggregate of consecutive sales from one cent to thousands of dollars. By this construction and arrangement of the parts I produce an accurate and reliable machine which will not only indicate the amount of each payment as it is made, but will keep a true record of the sum of all payments, which can be read at a glance without the trouble of adding them up, and also a true and complete adding-machine, while the registering mechanism cannot be tampered with, as the case-lid 16 over the register is locked up and only the man having the key thereto can read the amount registered.

Having thus fully described my invention so as to enable others to construct and operate the same, what I claim as new and desire to se- cure by Letters Patent of the United States is—

1. The combination, in a combined cash register and indicator and adding-machine, of oscillating key-levers adapted to operate both upward and downward, and indicator-wheels and registering-wheels, with intermediate lever, rack, and gear, and ratchet mechanism connecting said key-levers with the indicator-wheels, substantially as and for the purpose set forth.

2. The combination, in a combined cash register and indicator and adding-machine, with the oscillating key-levers adapted to operate both upward and downward, of horizontal main levers actuated by said projecting key-levers, and registering-wheels and indicator-wheels, with intermediate lever, rack, and gear, and ratchet mechanism connecting said horizontal main levers with the registering-wheels and indicator-wheels, whereby the movements of said main levers actuate said registering and said indicating wheels, substantially as and for the purpose set forth.

3. The combination, in a cash register and indicator and adding-machine, with the oscillating key-levers operating in both directions, the horizontal main levers arranged above and below said key-levers, and intermediate lever and ratchet mechanism operatively connecting said main levers with the indicating and registering wheels, of registering-wheels on the inside of the case, and indicator-wheels showing through openings in the outer case, with rack-bars and gears connecting and simultaneously actuating said registering and said indicating wheels, retracting-springs adapted to return the rack-bars and indicator-wheels to their normal positions, locking-dogs, and operating mechanism connecting said rack-bars with operating-keys, substantially as and for the purpose set forth.

4. The combination, in a combined cash register and indicator and adding-machine, of key-levers C and main levers $G'$ $G^2$ $G^3$ $G^4$, with the locking-lever $m$, having lugs $o'$ $o^2$ $o^3$ $o^4$ thereon, the sliding bar $u$, pivoted to the lever $m$, and the catch Q on the drawer 15, substantially as and for the purpose set forth.

5. The combination, in a combined cash register and indicator and adding-machine, of the spring I, with the key-levers C, pivoted at one end and adapted to operate both upward and downward, and having said springs bearing against their sides and retaining them in their central position by friction, substantially as and for the purpose set forth.

6. The combination, in a combined cash register and indicator and adding-machine, of the main levers $G'$ $G^2$ $G^3$ $G^4$, the connecting-rods $L'$ $L^2$ $L^3$ $L^4$, and the levers $M'$ $M^2$ $M^3$ $M^4$, with the rack-bars $J'$ $J^2$ $J^3$ $J^4$, the pinions $V'$ $V^2$ $V^3$ $V^4$, and registering-wheels $d'$ $d^2$ $d^3$ $d^4$ actuated thereby, the indicator-wheels $f'$ $f^2$ $f^3$ $f^4$, the pinions intermeshing with said rack-bars, the retracting-springs $O'$ $O^2$ $O^3$ $O^4$, and the dogs $P'$ $P^2$ $P^3$ $P^4$, substantially as and for the purpose set forth.

7. The combination, in a combined cash register and indicator and adding-machine, of the rack-bars $J'$ $J^2$ $J^3$ $J^4$, actuating the registering-disks $d'$ $d^2$ $d^3$ $d^4$, and the dogs $P'$ $P^2$ $P^3$ $P^4$, engaging with said rack-bars, with the horizontal bar $u$, adapted to engage with said dogs, the vertical lever $a$, pivoted to the lever $u$, the lever $a'$, pivoted to the lever $a$, and a catch $y'$ on the drawer 15 for operating said lever mechanism by the opening of the drawer, substantially as and for the purpose set forth.

8. The combination, in the alarm mechanism of a combined cash indicator and register and adding-machine, of a bell 3, a block 6, provided with a hammer for striking the bell and mounted on a bearing 6', an auxiliary lever 7, pivoted to said block 6 at right angles to said bearing 6', the guard 9, and the spring 10, with an inclined-faced catch 8 on the drawer 15, and a retracting-spring 11, substantially as and for the purpose set forth.

In testimony whereof I affix my signature in presence of two witnesses.

WILLIAM H. CLARK.

Witnesses:
H. M. STURGEON,
WM. P. HAYES.